(12) United States Patent
Mochizuki et al.

(10) Patent No.: US 7,556,576 B2
(45) Date of Patent: Jul. 7, 2009

(54) V-BELT CONTINUOUSLY VARIABLE TRANSMISSION AND STRADDLE-TYPE VEHICLE

(75) Inventors: Shigehiro Mochizuki, Shizuoka (JP); Kazuhiko Izumi, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 374 days.

(21) Appl. No.: 11/466,795

(22) Filed: Aug. 24, 2006

(65) Prior Publication Data

US 2007/0054763 A1 Mar. 8, 2007

(30) Foreign Application Priority Data

Sep. 5, 2005 (JP) ............................ 2005-256704

(51) Int. Cl.
*F16H 61/00* (2006.01)
*F16H 9/12* (2006.01)

(52) U.S. Cl. .............................. 474/18; 474/39; 474/20; 474/28; 74/371

(58) Field of Classification Search .................. 474/18, 474/19–21, 28, 39; 74/840–842, 113, 369, 74/371; 180/292, 251, 366, 908; 123/198 E
See application file for complete search history.

(56) References Cited

U.S. PATENT DOCUMENTS

| | | | | |
|---|---|---|---|---|
| 4,541,821 | A * | 9/1985 | Sakakibara | 474/17 |
| 5,025,686 | A * | 6/1991 | Sato et al. | 477/44 |
| 5,094,652 | A * | 3/1992 | Sakakibara et al. | 474/8 |
| 6,015,359 | A * | 1/2000 | Kunii | 474/18 |
| 6,468,170 | B1 * | 10/2002 | Ito | 474/18 |
| 6,694,836 | B2 * | 2/2004 | Kawamoto et al. | 74/371 |
| 7,004,860 | B2 * | 2/2006 | Yoshida et al. | 474/20 |

(Continued)

FOREIGN PATENT DOCUMENTS

JP 06-249309 A 9/1994

(Continued)

OTHER PUBLICATIONS

Mochizuki et al.: "V-Belt Continuously Variable Transmission and Straddle-Type Vehicle," U.S. Appl. No. 11/467,201; filed on Aug. 25, 2006.

*Primary Examiner*—Robert A Siconolfi
*Assistant Examiner*—San Aung
(74) *Attorney, Agent, or Firm*—Keating & Bennett, LLP

(57) ABSTRACT

In a V-belt continuously variable transmission (CVT), a sheave drive mechanism includes a movable tube coupled to a movable sheave half of a primary sheave so as to be rotatable with respect thereto and axially movable together therewith, a fixed tube disposed internally of and coaxially with the movable tube, and a ball screw mechanism provided between the fixed tube and the movable tube. The sheave drive mechanism further includes an outer peripheral wall arranged to cover the area from a fixed end of the fixed tube to the outer periphery of the movable tube, an oil seal provided between the movable tube and the outer peripheral wall to seal an internal space for enclosing the working surface of the ball screw mechanism, and a communication path for communication between the internal space and the outside of the outer peripheral wall. The V-belt (CVT) has a smooth feed operation of the ball screw mechanism in the sheave drive mechanism and has a high durability attained by waterproofing.

7 Claims, 5 Drawing Sheets

U.S. PATENT DOCUMENTS

| | | | |
|---|---|---|---|
| 7,291,078 B2 * | 11/2007 | Katou et al. | 474/28 |
| 2002/0027032 A1 * | 3/2002 | Tsutsumikoshi | 180/219 |
| 2003/0096668 A1 * | 5/2003 | Yoshida et al. | 474/39 |
| 2004/0102267 A1 * | 5/2004 | Murakami et al. | 474/69 |
| 2005/0037876 A1 * | 2/2005 | Unno et al. | 474/12 |

FOREIGN PATENT DOCUMENTS

| | | |
|---|---|---|
| JP | 2852994 B2 | 11/1998 |
| JP | 2002-227947 A | 8/2002 |
| JP | 2004-156657 A | 6/2004 |

* cited by examiner

V-BELT CONTINUOUSLY VARIABLE TRANSMISSION AND STRADDLE-TYPE VEHICLE

BACKGROUND OF THE INVENTION

1. Field of the Invention

The present invention relates to a V-belt continuously variable transmission (CVT) for transmitting a driving force of an engine to a driving wheel, and a straddle-type vehicle having the V-belt CVT disposed below a seat of the vehicle.

2. Description of the Related Art

Recently, there is an increasing demand for straddle-type vehicles called "ATVs (all-terrain vehicles)."

Also, there have been proposed various types of ATVs in which four wheels are provided, each wheel having a wide and low-pressure balloon tire or the like on the left and right sides of the front and rear ends of a body frame, the upper portion of the body frame is provided with steering handlebars, a fuel tank, and a straddle-type seat, arranged sequentially from the front wheel side to the rear wheel side, and a V-belt CVT disposed below the seat for transmitting a driving force of an engine to the driving wheels (see JP-A-2004-156657, for example).

The above-described V-belt CVT includes a primary sheave disposed on a primary sheave shaft, to which a driving force of the engine is input, and having a movable sheave half and a fixed sheave half to form a V-groove for receiving a belt; a secondary sheave disposed on a secondary sheave shaft, from which a driving force for the driving wheels is output, and having a movable sheave half and a fixed sheave half to form a V-groove for receiving a belt; an endless V-belt received in the respective V-grooves of the primary sheave and the secondary sheave to transmit a rotational driving force between both the sheaves; and a sheave drive mechanism for displacing the movable sheave half of the primary sheave in the axial direction to control the speed change ratio through resulting variations in respective groove widths of the primary sheave and the secondary sheave.

A previous type of sheave drive mechanism, in general, was the so-called centrifugal type which utilized centrifugal force produced according to the engine speed to displace a movable sheave half in the axial direction.

However, when the road on which the vehicle is running turns from a flat road to a climbing road, for example, the sheave drive mechanism of the centrifugal type does not perform a groove width control operation (specifically, a speed change operation) responsively according to changes in the road condition, irrespective of the intention of the rider, until the engine speed has actually decreased because of the increased load from the road. That is, the sheave drive mechanism has a problem of delayed response.

In order to solve the problem of delayed response, another type of V-belt CVT for use in scooter-type motorcycles has been proposed, which includes an electric motor; a control device for controlling the electric motor; a sheave drive mechanism for transmitting a driving force of the electric motor to the movable sheave half of the primary sheave to adjust the respective groove widths of the primary sheave and the secondary sheave; and a rotational speed sensor for detecting rotation of the primary sheave or the secondary sheave to inform the control device of the detected rotation so that the control device can perform a control according to the engine operating condition (see JP-B-2852994, for example).

As the sheave drive mechanism for use in this type of V-belt CVT, there has been proposed the use of a combination device of an electric motor and a ball screw mechanism to move a movable flange in order to control the respective groove widths of the primary sheave and the secondary sheave (see JP-A-2002-227947, for example).

Such a sheave drive mechanism using a ball screw mechanism can achieve a high transmission efficiency and reduce the load on the electric motor.

However, foreign matter entering the ball screw mechanism can damage the surfaces of the ball grooves and balls, deteriorating its durability. That is, foreign matter such as dust can enter a transmission case, in which the sheave drive mechanism of the V-belt CVT is installed, from an external space through air inlet and outlet ports provided in the transmission case for cooling purposes. Also, metal powder or the like produced through wear of the CVT can exist as foreign matter in the transmission case.

Therefore, a dustproof member such as felt is provided to block the gap between the outer peripheral surface of a female ball screw tube and the inner peripheral surface of an enclosing part so as to allow the passage of air therethrough but prevent foreign matter such as metal powder and dust from entering the ball screw mechanism.

With the increasing recent demand for ATVs, there is a need for V-belt CVTs for use in ATVs to electrically control the respective groove widths of the primary sheave and the secondary sheave in order to improve the response during the speed change process.

However, different from scooter-type motorcycles, ATVs are often used off-road and are thus at a high risk of water entering the transmission case through the air inlet and outlet ports for cooling purposes when running over deep puddles, down river sides, etc.

In the case where the sheave drive mechanism using the ball screw mechanism as described above is used in a V-belt CVT for ATVs, for example, the dustproof member may not be able to prevent water from entering the ball screw mechanism and may let water into the ball screw mechanism. Once water enters the ball screw mechanism, grease sealed therein may flow out thereby significantly deteriorating the durability of the sheave drive mechanism.

As an alternative to the above-described dustproof member, a seal member such as an oil seal with high waterproof performance may be provided to block the gap between the outer peripheral surface of the female ball bearing tube and the inner peripheral surface of the enclosing part. In this case, however, axial movement of the female ball screw tube causes expansion and contraction of the space sealed by the seal member and hence changes in pressure therein.

Thus, the oil seal cannot exhibit sufficient seal performance with its lip curled. In addition, the female ball screw tube may bear an increased load, and as a result, the movable sheave half cannot be fed smoothly and the load on the electric motor will be increased.

SUMMARY OF THE INVENTION

In order to overcome the problems described above, preferred embodiments of the present invention provide a V-belt CVT having a smooth feed operation of a ball screw mechanism in a sheave drive mechanism and having a high durability attained by waterproofing.

The present preferred embodiment of the V-belt type CVT includes a primary sheave disposed on a primary sheave shaft, to which a driving force of an engine is input, and forming a V-groove for receiving a belt; a secondary sheave disposed on a secondary sheave shaft, from which a driving force for a driving wheel is output, and forming a V-groove for receiving a belt; a V-belt received in the respective V-grooves of the primary sheave and the secondary sheave to transmit a rotational driving force between both the sheaves; the primary sheave and the secondary sheave being respectively defined by a movable sheave half and a fixed sheave half; an electric motor; a control device for controlling the electric motor; and a sheave drive mechanism for transmitting a driving force of the electric motor to the movable sheave half of the primary sheave to adjust respective groove widths of the primary sheave and the secondary sheave; wherein the sheave drive mechanism includes a movable tube coupled to the movable sheave half of the primary sheave so as to be rotatable with respect thereto and axially movable together therewith; a fixed tube disposed internally of and coaxially with the movable tube; a ball screw mechanism provided between the fixed tube and the movable tube; an outer peripheral wall arranged to cover an area from the fixed tube to an outer periphery of the movable tube; a seal member provided between the movable tube and the outer peripheral wall to seal an internal space for enclosing a working surface of the ball screw mechanism; and a communication path allowing for communication between the internal space and an outside of the outer peripheral wall.

It is preferred that the communication path extends vertically above the primary sheave shaft.

In addition, it is preferred that the communication path has at least one volumetric expansion space.

It also is preferred that the outer peripheral wall has a through hole through which the primary sheave shaft passes, and is secured to a support member for rotatably supporting an end of the primary sheave shaft on a crankcase, an end surface of the fixed tube on an opposite side from the crankcase is secured to a bottom of the outer peripheral wall, and the communication path has a communication groove provided between the end surface on the opposite side and the bottom of the outer peripheral wall, and a gap between the through hole and the primary sheave shaft.

Another preferred embodiment of the present invention includes a straddle-type vehicle having the V-belt CVT, which has the unique structure according to one of the preferred embodiments described above, disposed below a seat of the vehicle.

In the V-belt CVT constructed as described above, the seal member is provided between the movable tube and the outer peripheral wall to seal the internal space for enclosing the working surface of the ball screw mechanism in the sheave drive mechanism, and the internal space is in communication with the outside of the outer peripheral wall through the communication path.

Therefore, the pressure in the internal space can be balanced with the outside pressure even when the internal space is expanded and contracted by axial movement of the movable tube.

Thus, the seal member can exhibit sufficient seal performance, and the movable tube does not bear an increased load and hence can feed the movable sheave smoothly which can prevent an increased load on the electric motor.

In addition, in the case where the communication path extends vertically above the primary sheave shaft, water can be prevented from entering the internal space through the communication path unless water having entered the transmission case reaches an area above the primary sheave shaft.

In addition, in the case where the communication path has at least one volumetric expansion space in its middle, water drops adhering around the exit of the communication path will not be absorbed into the internal space upstream of the volumetric expansion space, even when a negative pressure is created in the internal space or the communication path because of axial movement of the movable tube, a temperature drop after stopping the engine, etc.

In addition, the straddle-type vehicle having the above-described unique construction, having the V-belt CVT of the present preferred embodiment disposed below the seat, can have a speed change operation that is highly responsive to the engine operating condition and with a high durability attained by waterproofing the sheave drive mechanism.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

A preferred embodiment of a V-belt continuously variable transmission (CVT) and a straddle-type vehicle according to another preferred embodiment of the present invention will hereinafter be described in detail with reference to the drawings.

Figure 1:
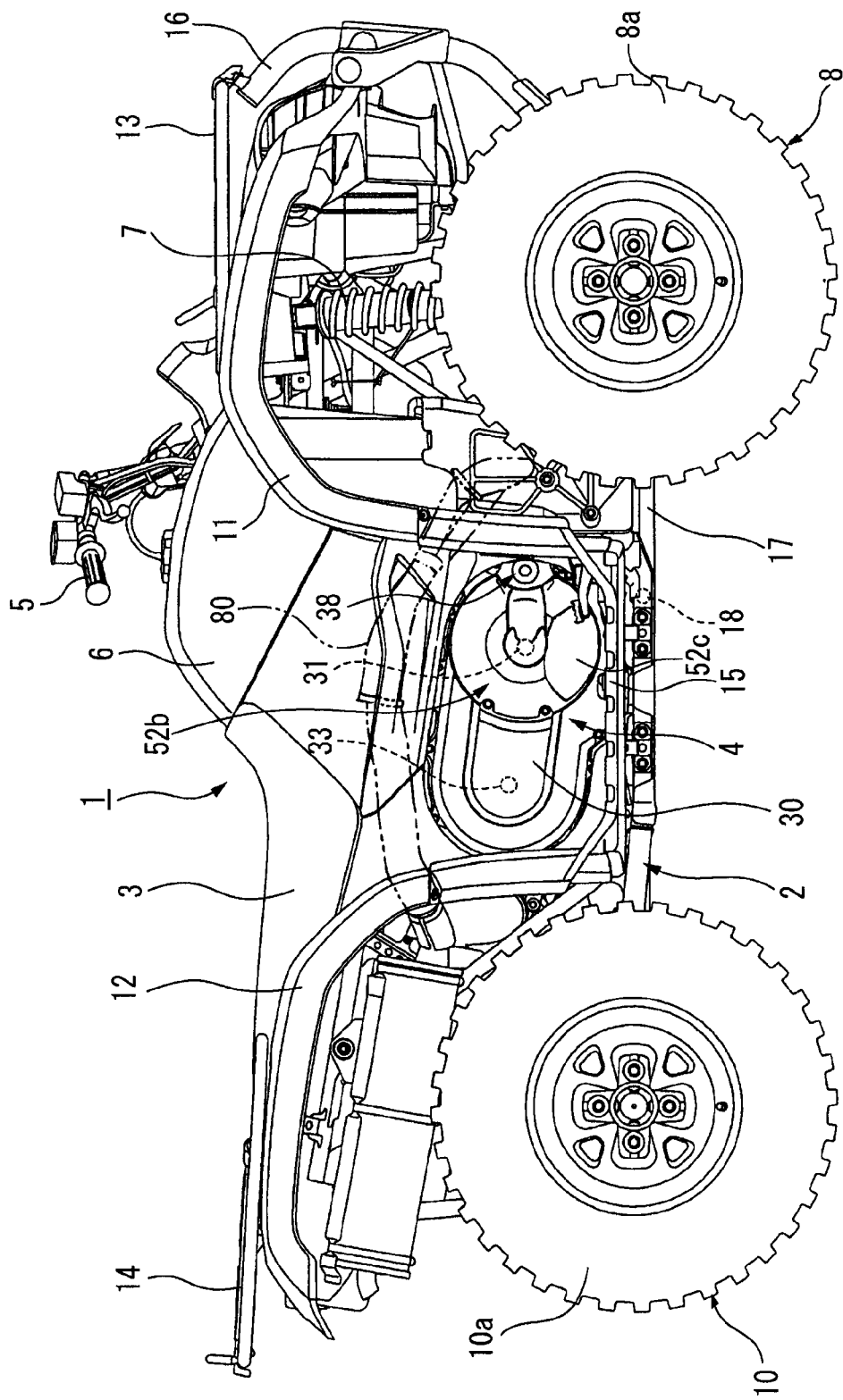
FIG. 1 is a right side view of a straddle-type vehicle incorporating a power unit in which a V-belt CVT according to a preferred embodiment of the present invention is assembled to an engine.
Figure 2:
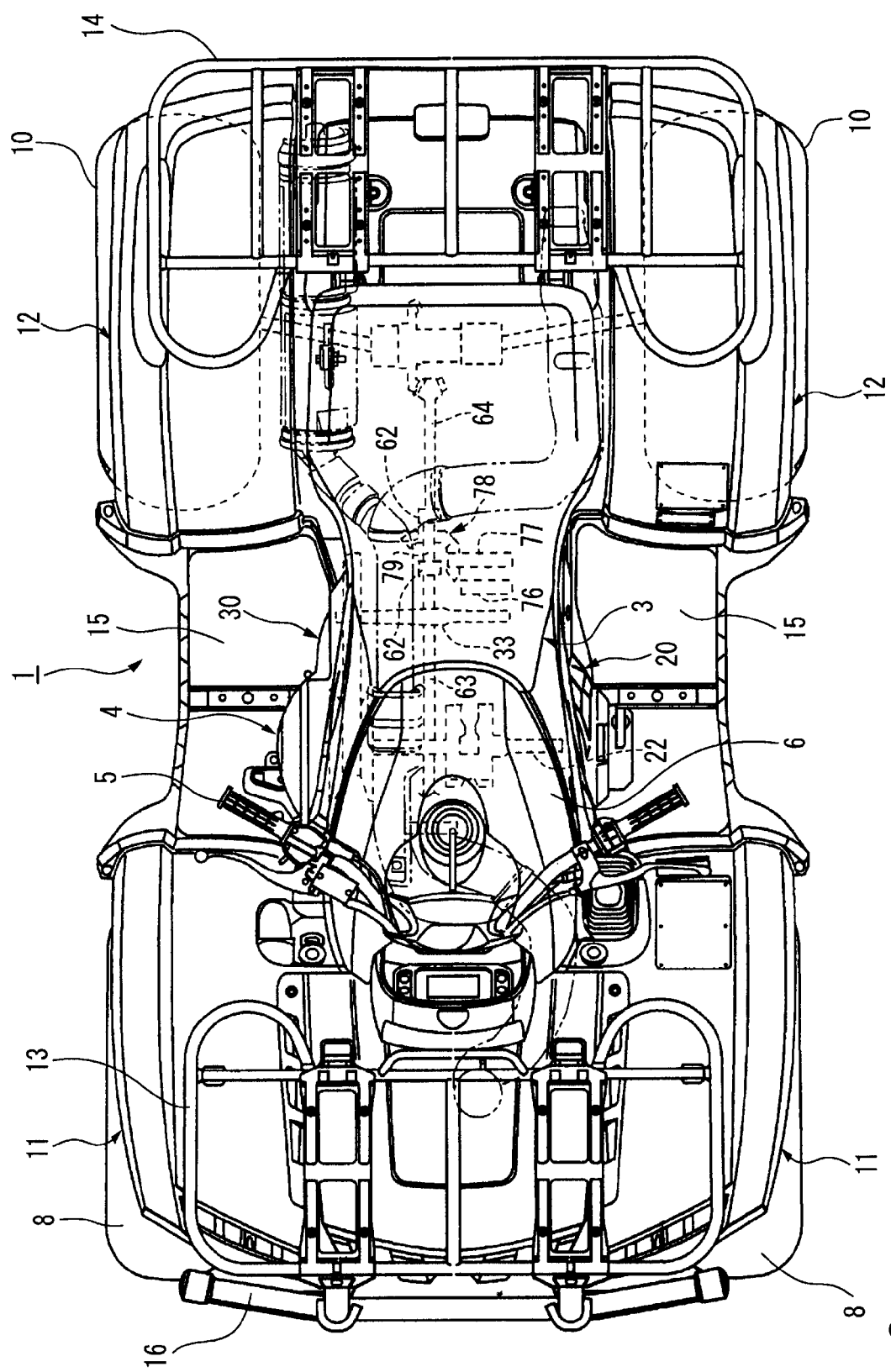
FIG. 2 is a plan view of the straddle-type vehicle shown in FIG. 1.
Figure 3:
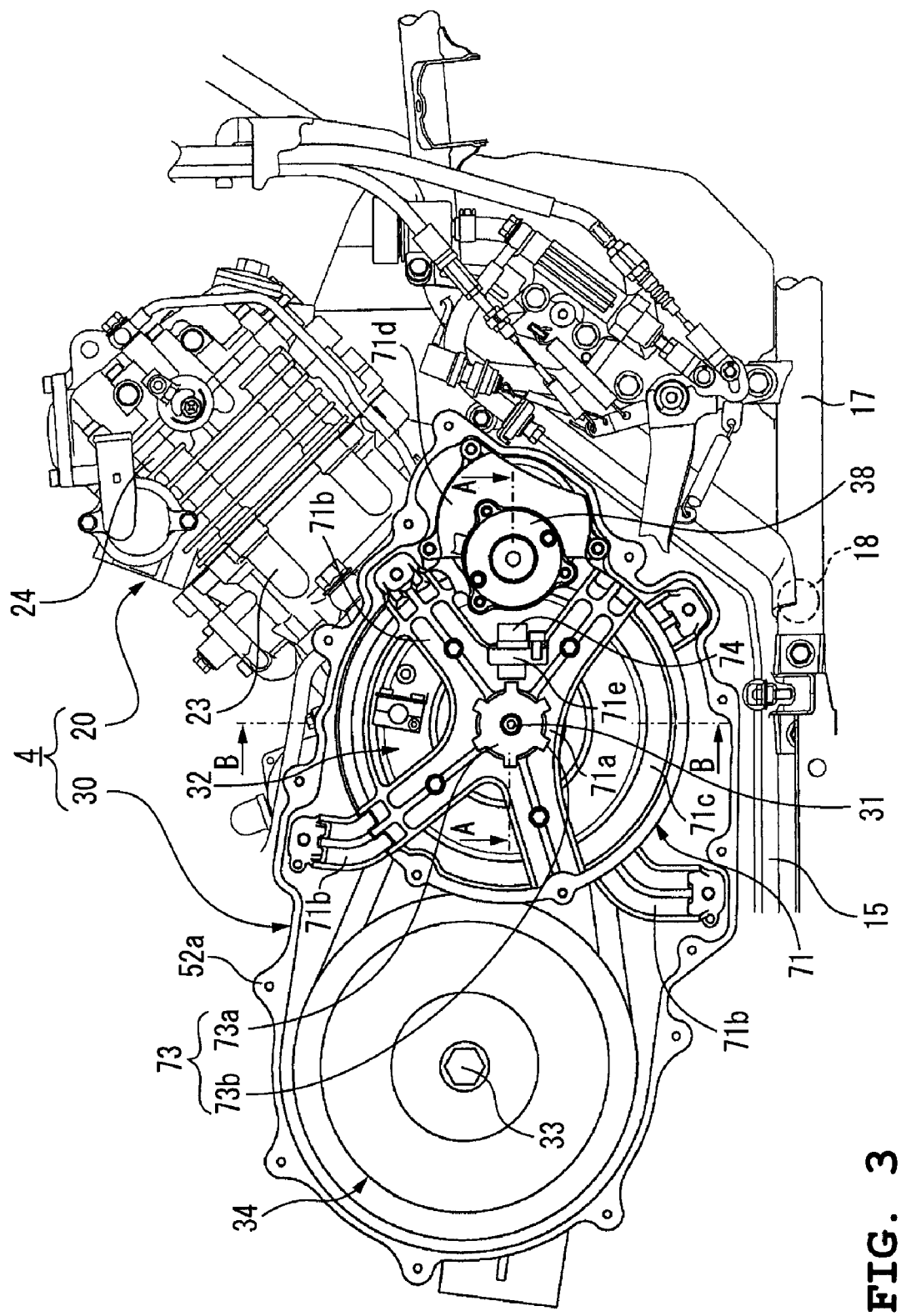
FIG. 3 is a right side view of the power unit mounted in the straddle-type vehicle shown in FIG. 1 with a cover of the V-belt CVT removed.
Figure 4:
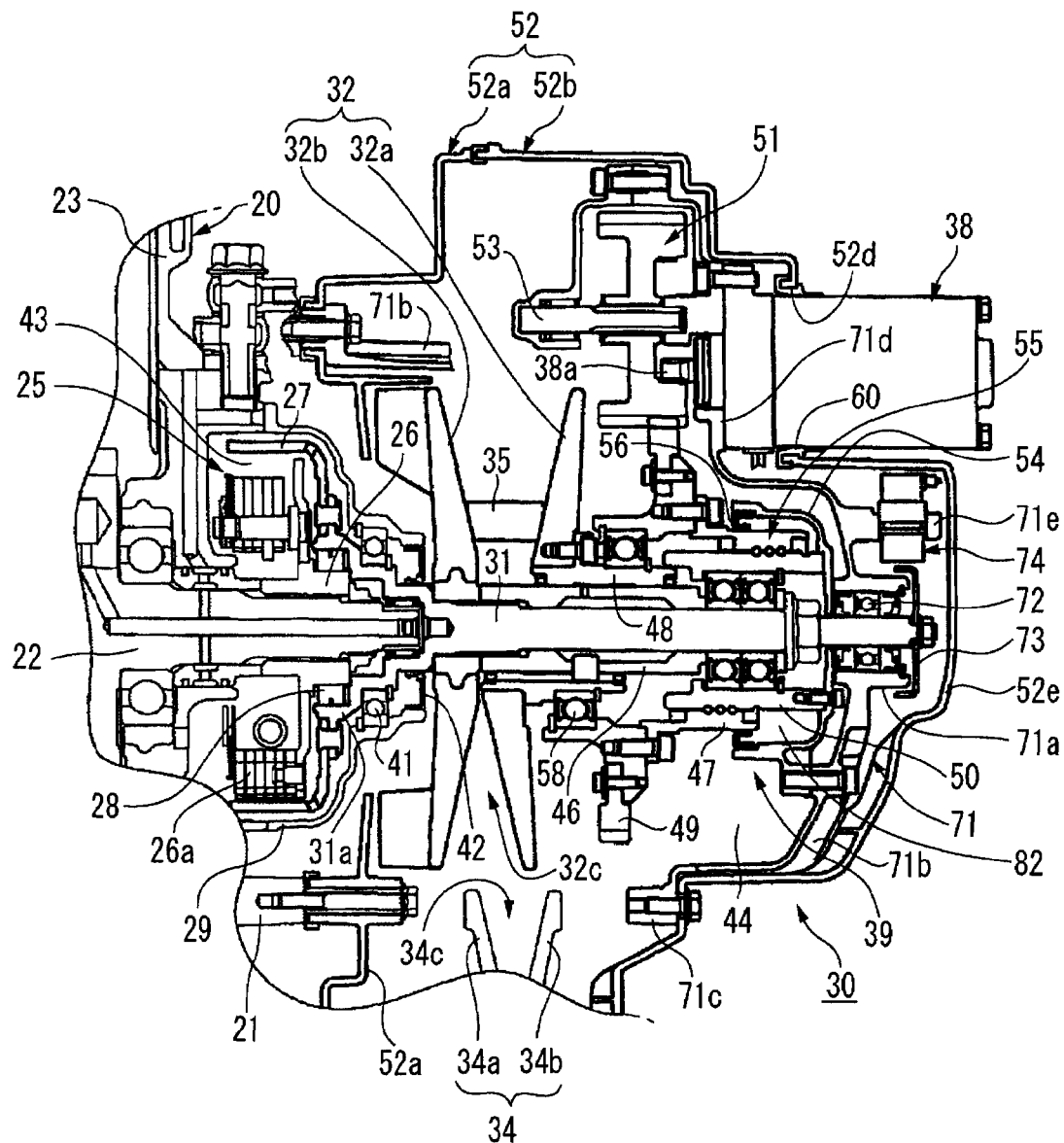
FIG. 4 is a sectional view taken along the line A-A of FIG. 3.
Figure 5:
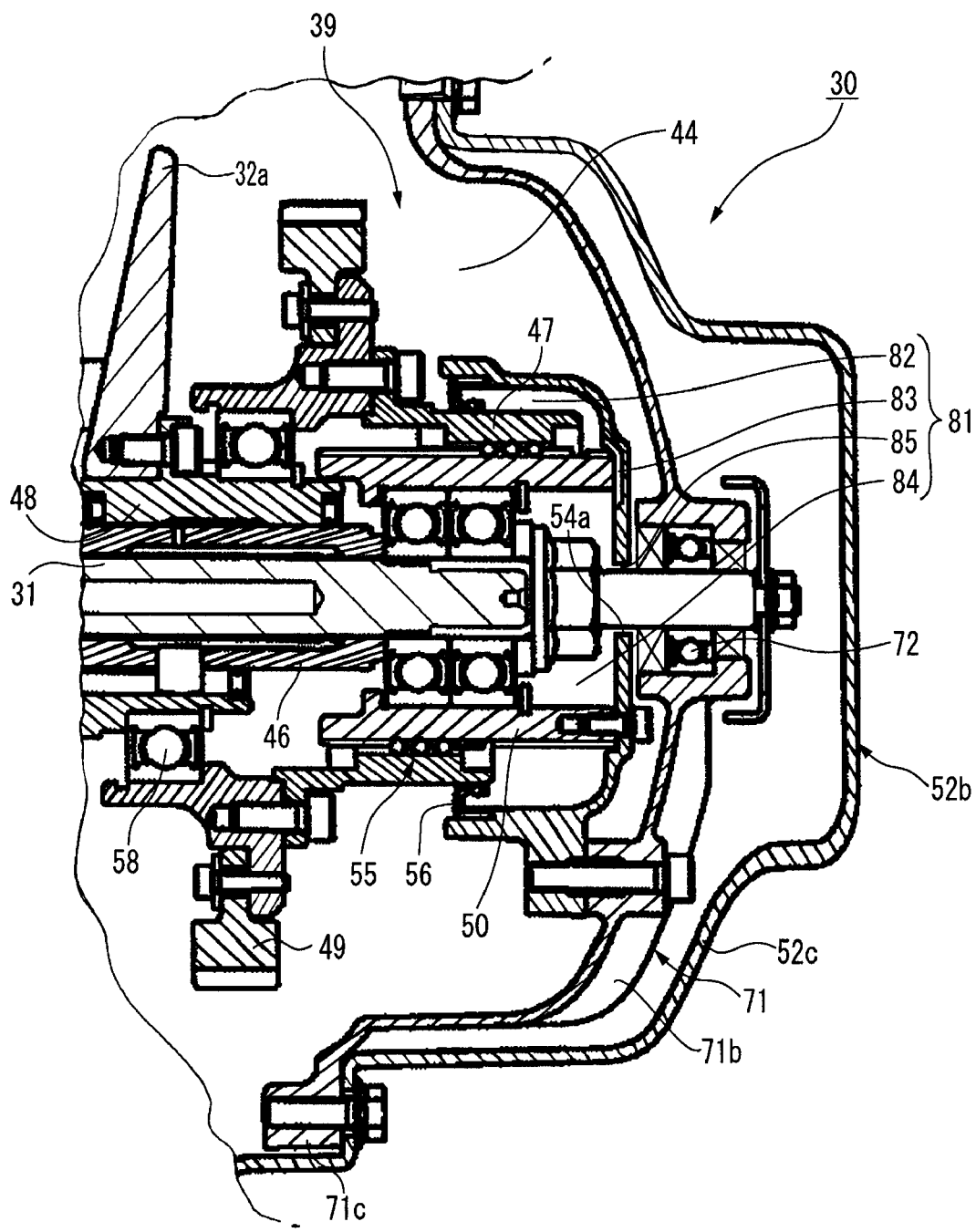
FIG. 5 is a sectional view taken along the line B-B of FIG. 3.

FIGS. 1 through 5 illustrate a straddle-type vehicle incorporating a V-belt CVT according to a preferred embodiment of the present invention. FIG. 1 is a right side view of the straddle-type vehicle incorporating a power unit in which the V-belt CVT according to the present preferred embodiment of the present invention is assembled to an engine. FIG. 2 is a plan view of the straddle-type vehicle shown in FIG. 1. FIG. 3 is a right side view of the power unit mounted in the straddle-type vehicle shown in FIG. 1 with a cover of the V-belt CVT removed. FIG. 4 is a sectional view taken along the line A-A of FIG. 3. FIG. 5 is a sectional view taken along the line B-B of FIG. 3. In this specification, "left" and "right" refer to the left and right from the rider's point of view.

An ATV (all-terrain vehicle) 1 shown in FIGS. 1 and 2 is a straddle-type vehicle having a seat 3, on which the operator (rider) straddles, located generally in the center of the upper portion of a body frame 2, and a power unit 4 located below the seat 3. The power unit 4 is an integral unit including an engine 20 and a V-belt CVT 30 for transmitting a driving force of the engine 20 to driving wheels connected to a side of a crankcase 21 of the engine 20 (see FIGS. 3 and 4).

The structure of the ATV 1, and the structures of the engine 20 and the V-belt CVT 30 defining the power unit 4 will be described sequentially below.

In the ATV 1, the upper portion of the body frame 2 in front of the seat 3 is provided with a fuel tank 6 and steering handlebars 5, arranged sequentially forward from the seat 3.

Left and right front wheels 8, 8, each having a wide and low-pressure balloon tire 8a, are disposed in the front portion of the body frame 2 via a front wheel suspension device 7, and left and right rear wheels 10, 10, each having a wide and low-pressure balloon tire 10a, are disposed in the rear portion of the frame 2 via a rear wheel suspension device (not shown).

The body frame 2 is also provided with left and right front fenders 11 for covering the upper side of the respective front wheels 8, left and right rear fenders 12 for covering the upper side of the respective rear wheels 10, and carriers 13, 14 provided on the upper side of the fenders 11, 12 to connect the left and right fenders. The body frame 2 is provided with a footboard 15 as a footrest for supporting the feet of the rider on the lower left and right sides of the seat 3. A bumper 16 is provided at the front end of the frame 2.

As shown in FIGS. 1 and 3, the body frame 2 is a double-cradle type in which a pair of left and right side frames 17, 17, preferably made of steel tubing and arranged generally in a rectangle having a longer dimension sideways, are joined by a number of cross pipes 18 extending in the vehicle width direction.

As shown in FIGS. 3 and 4, the power unit 4 preferably includes a water-cooled 4-cycle single-cylinder engine 20, and a V-belt CVT 30 bolted to the right side of the engine 20, with respect to the crankshaft direction.

As shown in FIG. 3, the engine 20 is mounted on the body frame 2 with an axis of its cylinder inclined upward and forward and a crankshaft 22 (see FIG. 4) oriented horizontally in the vehicle width direction. The upper mating surface of a cylinder block 23 is connected to a cylinder head 24, and the lower mating surface of the cylinder block 23 is connected to a crankcase 21 accommodating the crankshaft 22.

A generator (not shown) is mounted on the left end of the crankshaft 22, and a centrifugal clutch mechanism 25 is mounted on the right end thereof, as shown in FIG. 4.

The centrifugal clutch mechanism 25 includes an inner drum 26 that is spline-coupled with the crankshaft 22 to rotate together therewith, an outer drum 27 disposed to surround an outer periphery of the inner drum 26, and a one-way clutch 28 interposed between bosses of the pair of drums 26, 27.

As the rotational speed of the crankshaft 22 increases, a weight 26a of the inner drum 26 is pressed against the outer drum 27 by centrifugal force so that the outer drum 27 rotates.

The one-way clutch 28 functions to transmit power from the rear wheels to the crankshaft 22 in reverse in order to provide engine braking.

As shown in FIG. 4, the V-belt CVT 30 includes a primary sheave 32 disposed on a primary sheave shaft 31, to one end of which a driving force of the engine 20 is input from the crankshaft 22 via the centrifugal clutch mechanism 25, and having a movable sheave half 32a and a fixed sheave half 32b to form a V-groove 32c for receiving a belt; a secondary sheave 34 disposed on a secondary sheave shaft 33 (see FIG. 2), from one end of which a driving force for the driving wheels is output, and having a movable sheave half 34a and a fixed sheave half 34b to form a V-groove 34c for receiving a belt; a V-belt 35 received in the respective V-grooves 32c, 34c of the primary sheave 32 and the secondary sheave 34 to transmit a rotational driving force between both the sheaves; an electric motor 38; a control device (not shown) for controlling the electric motor 38 according to the vehicle running condition (operating condition); a sheave drive mechanism 39 for transmitting a driving force of the electric motor 38 to the movable sheave half 32a of the primary sheave 32 via a speed reduction mechanism 51 to control the respective groove widths of the primary sheave 32 and the secondary sheave 34; and a rotational speed sensor 74 for detecting a rotation of the primary sheave shaft 31 to inform the control device of the detected rotation.

The primary sheave shaft 31 is coaxial with the crankshaft 22 and rotatably supported by the centrifugal clutch mechanism 25 and a support member 71 such that the one end of the primary sheave shaft 31 is on the right end of the crankshaft 22. The one end of the primary sheave shaft 31 facing the crankshaft 22 (left end) is integral with a skirt 31a passing through an opening in the center of an end of a clutch cover 29 and surrounding the right end of the crankshaft 22. The skirt 31a is riveted or otherwise secured to the outer drum 27 of the centrifugal clutch mechanism 25.

The other end (right end) of the primary sheave shaft 31 is rotatably supported, via a roller bearing 72, on the center of the support member 71 secured to the crankcase 21.

As shown in FIG. 3, the die-cast aluminum support member 71 includes a bearing holding part 71a for supporting the right end of the primary sheave shaft 31 via the roller bearing 72, four legs 71b extending in four directions from the bearing holding part 71a, an annular coupling part 71c for coupling the legs 71b with a specific radius, a motor attachment part 71d provided on the annular coupling part 71c, and a sensor attachment part 71e. Ends of the legs 71b are bolted to the crankcase 21.

The primary sheave shaft 31 supported as described above is connected through the centrifugal clutch mechanism 25 to the crankshaft 22 in order to rotate together therewith when the rotational speed of the crankshaft 22 reaches a specific speed or higher.

The base end of the clutch cover 29 is secured to the crankcase 21. A portion of the clutch cover 29 around the center opening at its end is provided with a bearing 41 for rotatably supporting the primary sheave shaft 31 and a seal member 42 for sealing between the opening and the outer periphery of the skirt 31a. The clutch cover 29 surrounds a space 43 accommodating the centrifugal clutch mechanism 25 in a liquid-sealed manner to prevent oil used for the centrifugal clutch mechanism 25 from leaking into a belt chamber 44 of the V-belt CVT 30.

In this preferred embodiment, as shown in FIG. 4, the movable sheave half 32a of the primary sheave 32 is located on the other end of the primary sheave shaft with respect to the fixed sheave half 32b of the primary sheave 32.

Also, as shown in FIG. 4, the outer periphery of the secondary sheave 34 is located adjacent to the outer periphery of the primary sheave 32. This can effectively minimize the size of the V-belt CVT 30 in the longitudinal direction of the vehicle for compactness.

In this preferred embodiment, as shown in FIG. 4, the sheave drive mechanism 39 is located on the other end of the primary sheave shaft 31 with respect to the movable sheave half 32a of the primary sheave 32.

As shown in FIG. 5, the sheave drive mechanism 39 includes a guide tube 46 that is spline-fitted or otherwise mounted on the outer periphery of the primary sheave shaft 31 so as not to rotate relative thereto; a slider 48 mounted on the outer periphery of the guide tube 46 so as to be movable only axially and to which the movable sheave half 32a is secured; a movable tube 47 rotatably coupled with the outer periphery of the slider 48 via a bearing 58 and prohibited from moving relative to the slider 48, thereby being coupled with the movable sheave half 32a of the primary sheave 32 so as to be rotatable with respect thereto and axially movable together therewith; a reciprocating gear 49 secured to the movable tube 47; a fixed tube 50 disposed internally of and coaxially with the movable tube 47; a ball screw mechanism 55 provided between the fixed tube 50 and the movable tube 47; a cylindrical outer peripheral wall 54 arranged to cover an area from a fixed end of the fixed tube 50 (right end in FIG. 4) to the outer peripheral portion of the movable tube 47; an oil seal member 56 disposed between the outer peripheral wall of the movable tube 47 and the inner peripheral surface of the outer peripheral wall 54 to seal an internal space 82 accommodating the working surface of the ball screw member 55; a communication path 81 for communicating the internal space 82 with the belt chamber 44 outside the outer peripheral wall 54; and a speed reduction mechanism 51 for reducing the rotational speed of the electric motor 38 and inputting the reduced rotation to the reciprocating gear 49.

The fixed tube 50 moves the movable tube 47 in the axial direction of the primary sheave shaft 31 according to the rotation direction and amount of the reciprocating gear 49 via the ball screw mechanism 55 screwed on the movable tube 47. An end surface of the fixed tube 50 is bolted to the bottom of the outer peripheral wall 54 for covering an end of the movable tube 47.

The outer peripheral wall 54 has a through hole 54a through which the primary sheave shaft 31 passes, and is bolted to a support member 71 for rotatably supporting the other end of the primary sheave shaft 31 on the crankcase 21.

The sheave drive mechanism 39 controls axial movement of the movable sheave half 32a according to the rotation input from the electric motor 38 to the reciprocating gear 49 via the speed reduction mechanism 51.

The communication path 81 in this preferred embodiment preferably has a communication groove 83 provided between the fixed end surface of the fixed tube 50 (end surface on the opposite side from the crankcase 21) and the bottom of the outer peripheral wall 54 for communication between an inside space 84 of the fixed tube 50 and the internal space 82, and a gap 85 between the through hole 54a of the outer peripheral wall 54 and the primary sheave shaft 31 for communication between the inside space 84 and the belt chamber 44.

The communication groove 83 is formed before assembly to extend vertically in the bottom of the outer peripheral wall 54 above the primary sheave shaft 31, and communicates the inside space 84 and the internal space 82 after the end surface of the fixed tube 50 is secured to the bottom of the outer peripheral wall 54.

The movable sheave half 34a of the secondary sheave 34 is normally urged by a spring member in the direction of reducing the groove width, so that the groove width is controlled based on the balance between the urging force and the tension of the wrapped V-belt 35.

Thus, when the groove width of the primary sheave 32 is controlled by operation of the sheave drive mechanism 39 and hence the wrapping diameter of the V-belt 35 around the primary sheave 32 is changed, the tension of the V-belt 35 and hence the groove width of the secondary sheave 34 are changed accordingly for a specific speed change ratio.

As shown in FIGS. 3 and 4, a portion of the primary sheave shaft 31 on the other end with respect to the primary sheave 32 is provided with a measurement plate 73 as a part to be detected for the rotational speed sensor 74 in order to detect the rotational speed of the primary sheave shaft 31.

As shown in FIG. 3, the measurement plate 73 includes a disk 73a and projections for measurement 73b provided on the outer periphery of the disk 73a at regular intervals, and is smaller in outside diameter than the reciprocating gear 49 of the sheave drive mechanism 39.

In this preferred embodiment, the measurement plate 73 is located on the other end of the primary sheave shaft 31 with respect to the roller bearing 72 for rotatably supporting the other end of the primary sheave shaft 31, or located at the axial end of the primary sheave shaft 31. The measurement plate 73 is larger in outside diameter than the roller bearing 72. That is, the measurement plate 73 is larger than the roller bearing 72 and smaller than the reciprocating gear 49 in outside diameter.

The measurement plate 73 is concentric with the primary sheave shaft 31 and secured to the axial end of the primary sheave shaft 31 by a nut.

In this preferred embodiment, the rotational speed sensor 74 for detecting rotation of the primary sheave shaft 31 based on rotation of the measurement plate 73 is located on the other end of the primary sheave shaft 31 with respect to the sheave drive mechanism 39 and around the outer periphery of the measurement plate 73.

The rotational speed sensor 74 is attached to the support member 71 via the attachment part 71e located a suitable distance away from the measurement plate 73 in a radially outward direction, and measures the rotation of the primary sheave shaft 31 based on the passing of the projections for measurement 73b to inform the control device for controlling the operation of the electric motor 38 of the measured rotational speed.

As shown in FIG. 3, the rotational speed sensor 74 is attached to the support member 71 above a horizontal plane including the primary sheave shaft 31.

Out of the constituent parts of the V-belt CVT 30, those other than the electric motor 38 are accommodated in a transmission case 52 connected to a side of the crankcase 21. The plastic or resin transmission case 52 is defined by a lower case 52a connected to a mating surface of the crankcase 21 on the right side in the crankshaft direction, and an upper case 52b removably attached to the lower case 52a, and defines the belt chamber 44 beside the crankcase 21.

The upper case 52b as a cover of the V-belt CVT 30 is provided with a recess 52c for ensuring a space for the foot of the rider so that the projecting upper case 52b will not interfere with the rider's foot.

In addition, the upper case 52b is provided with a motor attachment hole 52d for allowing a housing of the electric motor 38 to pass therethrough and is sealed by a seal member 60 (see FIG. 4). Further, the upper case 52b is provided with a projecting portion 52e, in accordance with the above-described position of the rotational speed sensor 74, for covering the outside of the rotational speed sensor 74.

The footboard 15 is located on the outer side of the V-belt CVT 30 in the vehicle width direction, as shown in FIG. 2, and below the primary sheave shaft 31 and the secondary sheave shaft 33.

In the ATV 1 of this preferred embodiment, as shown in FIG. 2, the output of the secondary sheave shaft 33 of the power unit 4 is transmitted to an intermediate shaft 76 and an output shaft 77 via a suitable gear train, and then from the output shaft 77 to a power transmission shaft 79 disposed in the longitudinal direction of the vehicle via a bevel gear mechanism 78.

The power is then transmitted from the power transmission shaft 79 via a front/rear universal joint 62 to a front wheel drive shaft 63 and a rear wheel drive shaft 64 which are connected to the left and right front wheels 8 and the left and right rear wheels 10, respectively.

In this preferred embodiment, as shown in FIG. 1, an exhaust pipe 80 of the engine 20 is disposed above the V-belt CVT 30, and the electric motor 38 is disposed in front of the V-belt CVT 30.

This arrangement prevents the electric motor 38 from interfering with the foot of the rider and the exhaust pipe 80.

The operation of the V-belt CVT 30 for a motorcycle according to the present preferred embodiment is described below.

When a speed change signal is input from the control device to the electric motor 38, rotation of the electric motor 38 rotates the movable tube 47 via the speed reduction mechanism 51 and the reciprocating gear 49. Lead action of the ball screw mechanism 55 moves the slider 48 which is secured to the movable tube 47 via the bearing 58, which in turn moves the movable sheave 32a which is integral with the slider 48, resulting in a change of the width of the V-groove 32c of the primary sheave 32.

When the groove width of the primary sheave 32 becomes smaller, for example, the wrapping diameter of the V-belt 35 becomes larger and the speed change ratio shifts toward "High." When the groove width of the primary sheave 32 becomes larger, the wrapping diameter of the V-belt 35 becomes smaller and the speed change ratio shifts toward "Low." On the other hand, the width of the V-groove 34c of the secondary sheave 34 changes in the opposite way from the primary sheave 32 as the groove width of the primary sheave 32 changes.

During a speed change operation, the ball screw mechanism 55 in the sheave drive mechanism 39 allows smooth movement of the movable tube 47 and hence can achieve a high transmission efficiency, thereby reducing the load on the electric motor 38.

As described above, in the V-belt CVT 30 of the ATV 1, the oil seal 56 is provided between the movable tube 47 and the outer peripheral wall 54 to seal the internal space 82 for enclosing the working surface of the ball screw mechanism 55 in the sheave drive mechanism 39, and the internal space 82 is in communication with the outside of the outer peripheral wall 54 through the communication path 81.

Therefore, the pressure in the internal space 82 can be balanced with the outside pressure even when the internal space 82 is expanded and contracted by axial movement of the movable tube 47.

Thus, the oil seal 56 can exhibit a sufficient seal performance without its lip being curled. In addition, the movable tube 47 does not bear an increased load and hence can feed the movable sheave half 32a smoothly, which can prevent an increased load on the electric motor 38.

Since the communication path 81 of this preferred embodiment extends vertically above the primary sheave shaft 31, water can be prevented from entering the internal space 82 through the communication path 81, unless water having entered the transmission case 52 reaches the communication groove 83 above the primary sheave shaft 31.

In addition, in the communication path 81, the inside space 84 provided between the communication groove 83 and the gap 85 serves as a volumetric expansion space. Thus, water drops adhering around the gap 85, which is an exit from the communication path 81, are confined within the inside space 84 and hence will not be absorbed into the internal space 82 upstream of the inside space 84, even when a negative pressure is created in the internal space 82 or the communication path 81 because of axial movement of the movable tube 47, the temperature drops after stopping the engine, etc.

That is, the ATV 1 of the present preferred embodiment, having the V-belt CVT 30 disposed below the seat 3, can provide a straddle-type vehicle with a speed change operation that is highly responsive to the engine operating condition and with a high durability attained by waterproofing the sheave drive mechanism 39.

The present invention can be applied to straddle-type vehicles other than ATVs (all-terrain vehicles) such as disclosed in the above-described preferred embodiments. For example, the straddle-type vehicles according to the present invention include motorcycles, motorbikes, scooters, buggies, golf carts, and other various vehicles having a seat that the rider straddles.

The structure of the communication path according to the present invention is not limited to that of the communication path 81 disclosed in the above-described preferred embodiments, but various modifications may be made thereto without departing from the sprit and scope of the present invention.

For example, the communication groove 83, which was provided before assembly in the bottom of the outer peripheral wall 54 in the above-described preferred embodiments, may be provided before assembly in an end surface of the fixed tube 50 to be fixed, or may be provided before assembly in both members. The communication groove can be easily provided by forming a groove before assembly in the outer peripheral wall or the fixed tube by pressing or cutting, for example.

It is to be understood that the communication path may be drilled directly in the outer peripheral wall.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A V-belt continuously variable transmission comprising:
   a primary sheave disposed on a primary sheave shaft, to which a driving force of an engine is input, and arranged to define a V-groove for receiving a belt;
   a secondary sheave disposed on a secondary sheave shaft, from which a driving force for a driving wheel is output, and arranged to define a V-groove for receiving a belt;
   a V-belt received in the respective V-grooves of the primary sheave and the secondary sheave to transmit a rotational driving force between both the sheaves;
   the primary sheave and the secondary sheave being respectively defined by a movable sheave half and a fixed sheave half;
   an electric motor;
   a control device arranged to control the electric motor; and
   a sheave drive mechanism arranged to transmit a driving force of the electric motor to the movable sheave half of the primary sheave to control respective groove widths of the primary sheave and the secondary sheave; wherein
   the sheave drive mechanism includes:
      a movable tube coupled to the movable sheave half of the primary sheave so as to be rotatable with respect thereto and axially movable together therewith;
      a fixed tube disposed internally of and coaxially with the movable tube;
      a ball screw mechanism provided between the fixed tube and the movable tube;
      an outer peripheral wall arranged to cover an area from the fixed tube to an outer periphery of the movable tube;
      a seal member provided between the movable tube and the outer peripheral wall to seal an internal space arranged to enclose a working surface of the ball screw mechanism; and
      a communication path arranged to communicate the internal space with an outside of the outer peripheral wall.

2. The V-belt continuously variable transmission according to claim 1, wherein the communication path extends vertically above the primary sheave shaft.

3. The V-belt continuously variable transmission according to claim 1, wherein the communication path includes at least one volumetric expansion space within the communication path.

4. The V-belt continuously variable transmission according to claim 1, further comprising a support member arranged to rotatably support an end of the primary sheave shaft, wherein the outer peripheral wall includes a through hole through which the primary sheave shaft passes and the outer peripheral wall is secured to the support member.

5. The V-belt continuously variable transmission according to claim 4, wherein an end surface of the fixed tube is secured to a bottom of the outer peripheral wall, and the communication path includes a communication groove provided between the end surface and the bottom of the outer peripheral wall.

6. The V-belt continuously variable transmission according to claim 5, wherein the communication path includes a gap between the through hole and the primary sheave shaft.

7. A straddle-type vehicle having the V-belt continuously variable transmission according to claim 1 disposed below a seat of the vehicle.

* * * * *